United States Patent
Oganesian et al.

(10) Patent No.: US 9,233,511 B2
(45) Date of Patent: Jan. 12, 2016

(54) METHOD OF MAKING STAMPED MULTI-LAYER POLYMER LENS

(75) Inventors: Vage Oganesian, Sunnyvale, CA (US); Zhenhua Lu, Penfield, NY (US)

(73) Assignee: Optiz, Inc., Palo Alto, CA (US)

( * ) Notice: Subject to any disclaimer, the term of this patent is extended or adjusted under 35 U.S.C. 154(b) by 277 days.

(21) Appl. No.: 13/468,632

(22) Filed: May 10, 2012

(65) Prior Publication Data

US 2013/0300009 A1    Nov. 14, 2013

(51) Int. Cl.
*B29D 11/00*    (2006.01)

(52) U.S. Cl.
CPC .................... *B29D 11/00403* (2013.01)

(58) Field of Classification Search
CPC .................................. B29D 11/0403
USPC ........................................ 264/1.38
See application file for complete search history.

(56) References Cited

U.S. PATENT DOCUMENTS

| | | | | |
|---|---|---|---|---|
| 4,904,512 A | * | 2/1990 | Yamada et al. | 428/36.7 |
| 5,750,156 A | * | 5/1998 | Maus et al. | 425/139 |
| 5,914,074 A | * | 6/1999 | Martin et al. | 264/1.38 |
| 6,683,421 B1 | * | 1/2004 | Kennedy et al. | 315/291 |
| 7,070,406 B2 | * | 7/2006 | Jeans | 425/174.4 |
| 2003/0230817 A1 | * | 12/2003 | Crook | 264/1.38 |
| 2004/0251525 A1 | | 12/2004 | Zilber | |
| 2005/0104179 A1 | | 5/2005 | Zilber | |
| 2005/0205977 A1 | | 9/2005 | Zilber | |
| 2007/0138498 A1 | | 6/2007 | Zilber | |
| 2007/0190691 A1 | | 8/2007 | Humpston | |
| 2007/0190747 A1 | | 8/2007 | Humpston | |
| 2008/0012115 A1 | | 1/2008 | Zilber | |
| 2008/0017879 A1 | | 1/2008 | Zilber | |
| 2008/0083976 A1 | | 4/2008 | Haba | |
| 2008/0083977 A1 | | 4/2008 | Haba | |
| 2008/0099900 A1 | | 5/2008 | Oganesian | |

(Continued)

FOREIGN PATENT DOCUMENTS

CN    101890817 A    11/2010
JP    2009-214387      9/2009

(Continued)

OTHER PUBLICATIONS

U.S. Appl. No. 13/157,193, filed Jun. 9, 2011, Oganesian, Vage.

(Continued)

*Primary Examiner* — Joseph S Del Sole
*Assistant Examiner* — John Robitaille
(74) *Attorney, Agent, or Firm* — DLA Piper LLP (US)

(57) ABSTRACT

A method of forming lenses includes providing a lens handler having a plurality of cavities formed into an upper surface thereof. For each of the cavities, the method includes dispensing a first polymer material into the cavity, pressing a non-planar stamp surface onto the first polymer material wherein an upper surface of the first polymer material is conformed to the non-planar stamp surface, and applying UV light to the first polymer material to cure the first polymer material. A dispenser carrier can be used that includes a plurality of liquid polymer dispensers. A stamp carrier can be used that includes a plurality of stamps each having a non-planar stamp surface. Alternately, a stamp handler having a plurality of stamps arranged along a curved surface can be used to roll along the polymer material such that an upper surface thereof conforms to the non-planar stamp surfaces.

3 Claims, 20 Drawing Sheets

(56) References Cited

U.S. PATENT DOCUMENTS

| | | |
|---|---|---|
| 2008/0099907 A1 | 5/2008 | Oganesian |
| 2008/0116544 A1 | 5/2008 | Grinman |
| 2008/0116545 A1 | 5/2008 | Grinman |
| 2008/0150121 A1 | 6/2008 | Oganesian |
| 2008/0246136 A1 | 10/2008 | Haba |
| 2009/0115047 A1 | 5/2009 | Haba |
| 2009/0160065 A1 | 6/2009 | Haba |
| 2009/0212381 A1 | 8/2009 | Crisp |
| 2010/0053407 A1 | 3/2010 | Crisp |
| 2010/0225006 A1 | 9/2010 | Haba |
| 2010/0230812 A1 | 9/2010 | Oganesian |
| 2011/0012259 A1 | 1/2011 | Grinman |
| 2011/0031629 A1 | 2/2011 | Haba |
| 2011/0033979 A1 | 2/2011 | Haba |
| 2011/0049696 A1 | 3/2011 | Haba |
| 2011/0187007 A1 | 8/2011 | Haba |
| 2012/0018863 A1 | 1/2012 | Oganesian |
| 2012/0018868 A1 | 1/2012 | Oganesian |
| 2012/0018893 A1 | 1/2012 | Oganesian |
| 2012/0018894 A1 | 1/2012 | Oganesian |
| 2012/0018895 A1 | 1/2012 | Oganesian |
| 2012/0020026 A1 | 1/2012 | Oganesian |
| 2012/0068327 A1 | 3/2012 | Oganesian |
| 2012/0068330 A1 | 3/2012 | Oganesian |
| 2012/0068351 A1 | 3/2012 | Oganesian |
| 2012/0068352 A1 | 3/2012 | Oganesian |

FOREIGN PATENT DOCUMENTS

| | | |
|---|---|---|
| JP | 2012-032528 | 2/2012 |
| TW | 490388 | 6/2002 |
| TW | 201139125 A | 11/2011 |

OTHER PUBLICATIONS

U.S. Appl. No. 13/157,202, filed Jun. 9, 2011, Oganesian, Vage.
U.S. Appl. No. 13/157,207, filed Jun. 9, 2011, Oganesian, Vage.
U.S. Appl. No. 13/186,357, filed Jul. 19, 2011, Oganesian, Vage.
U.S. Appl. No. 13/225,092, filed Sep. 2, 2011, Oganesian, Vage.
U.S. Appl. No. 13/301,683, filed Nov. 21, 2011, Oganesian, Vage.
U.S. Appl. No. 13/312,826, filed Dec. 6, 2011, Oganesian, Vage.
U.S. Appl. No. 13/343,682, filed Jan. 4, 2012, Oganesian, Vage.
U.S. Appl. No. 13/427,604, filed Mar. 22, 2012, Oganesian, Vage.
U.S. Appl. No. 13/356,328, filed Jan. 23, 2012, Oganesian, Vage.
U.S. Appl. No. 13/559,510, filed Jul. 26, 2012, Oganesian, Vage.
U.S. Appl. No. 13/423,045, filed Mar. 16, 2012, Oganesian, Vage.
U.S. Appl. No. 13/609,002, filed Sep. 10, 2012, Oganesian, Vage.
Korean Notice of Preliminary Rejection dated May 26, 2014 corresponding to the related Korean Patent Application No. 10-2013-0052677. (English Translation).
Taiwanese Office Action dated Jul. 15, 2015 corresponding to the related Taiwanese Patent Application No. 102104403.
Chinese Office Action dated Jan. 5, 2015 corresponding to the related Chinese Patent Application No. 201210182108.8.

* cited by examiner

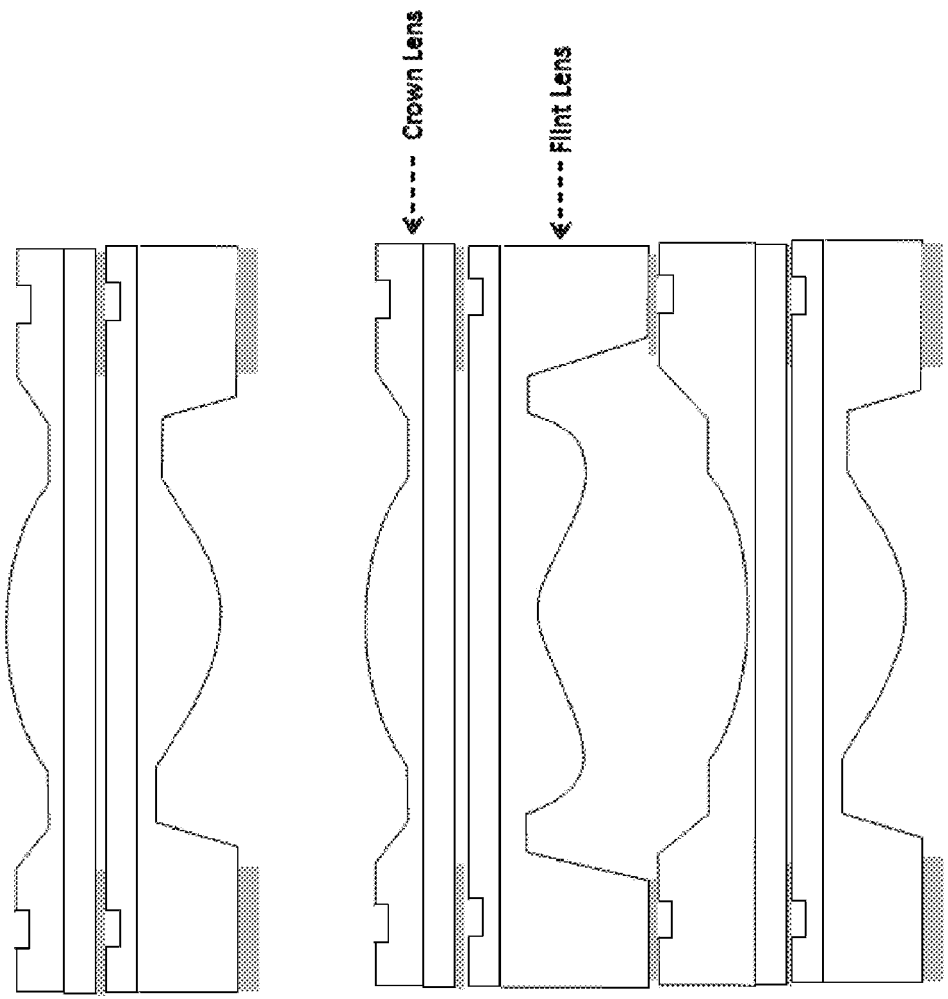

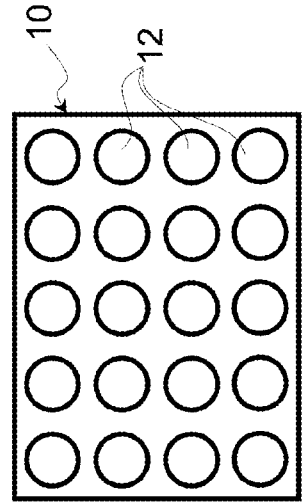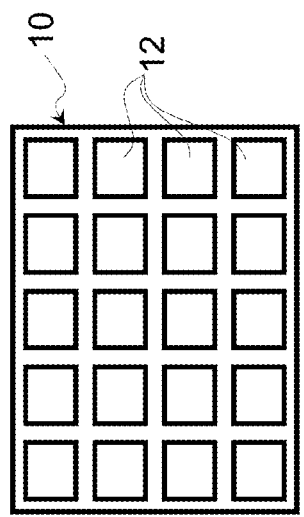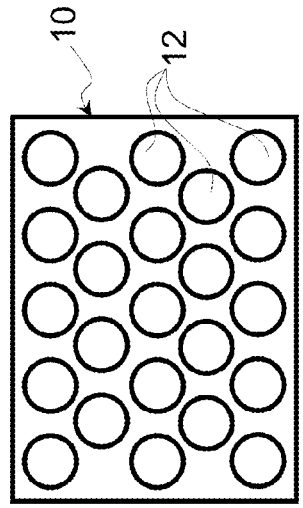

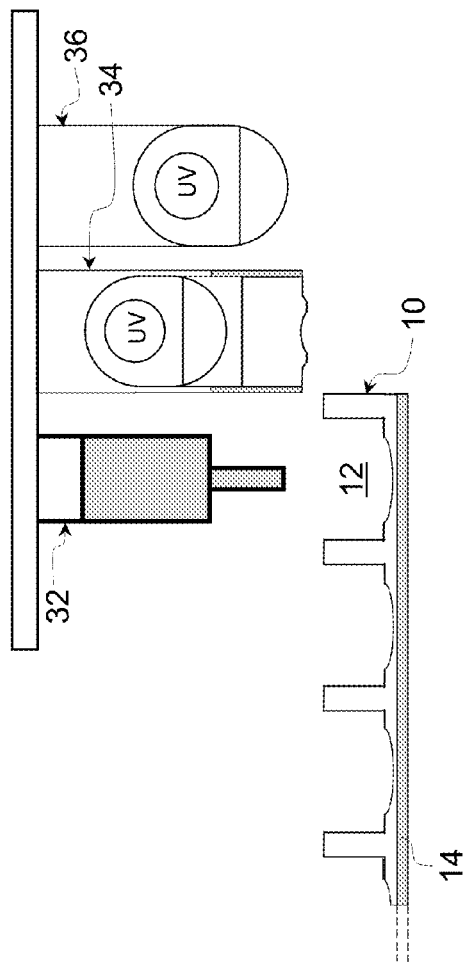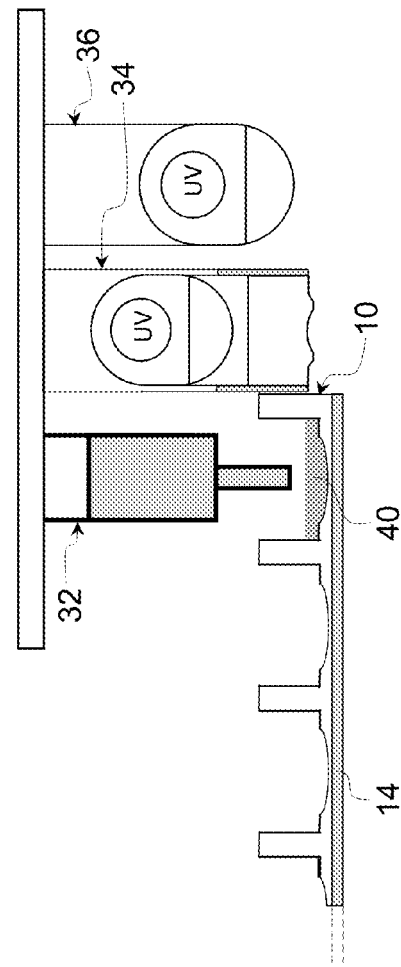
FIG. 9A
FIG. 9B

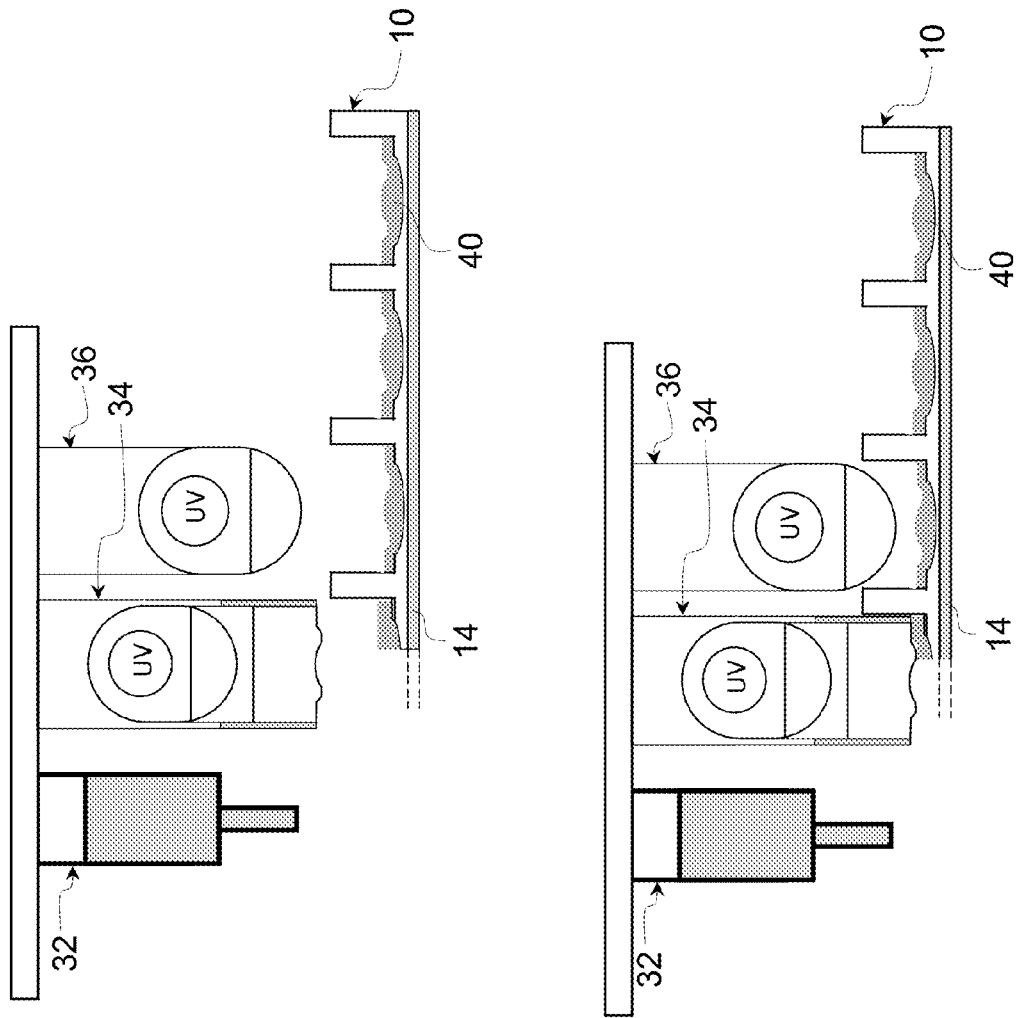

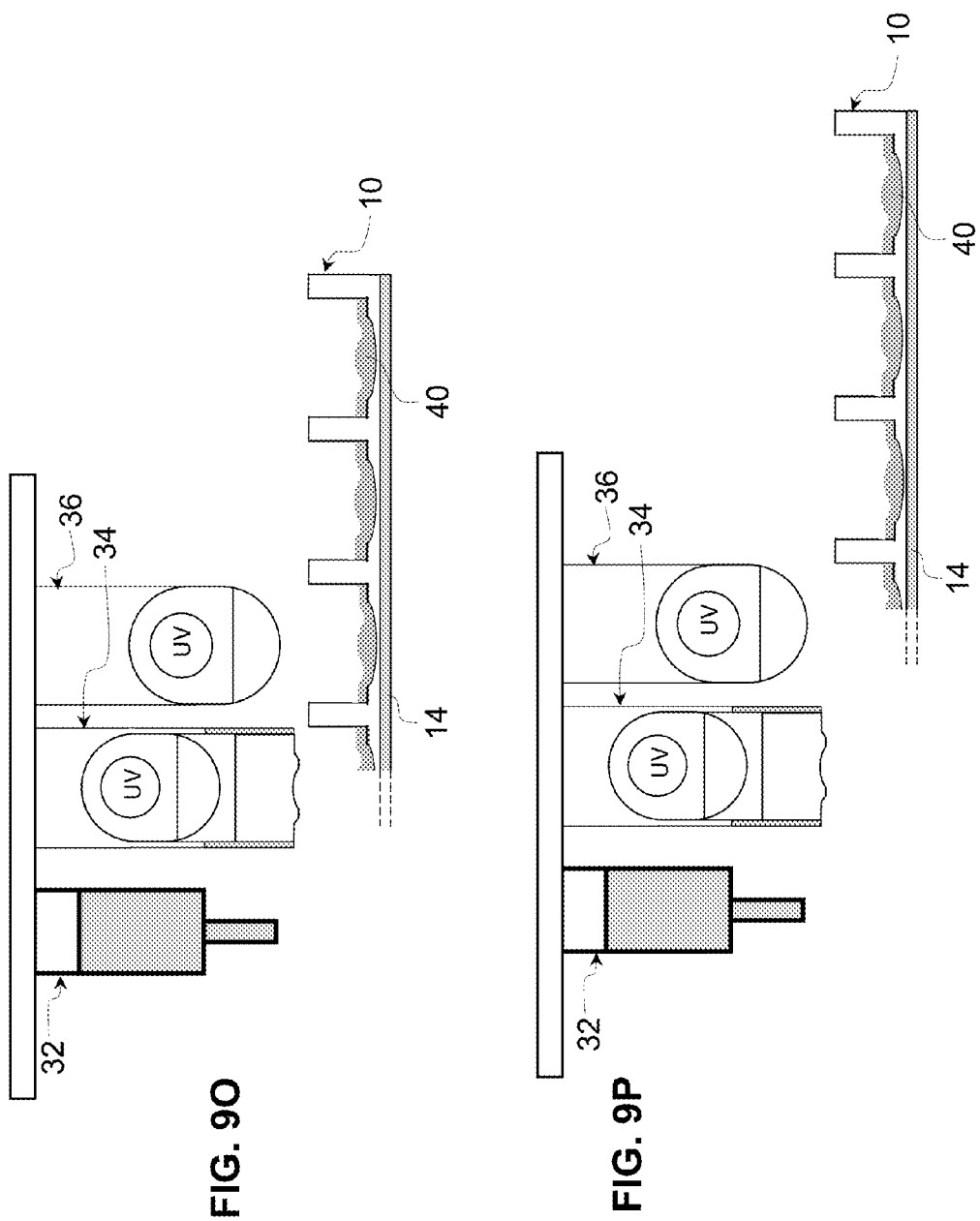

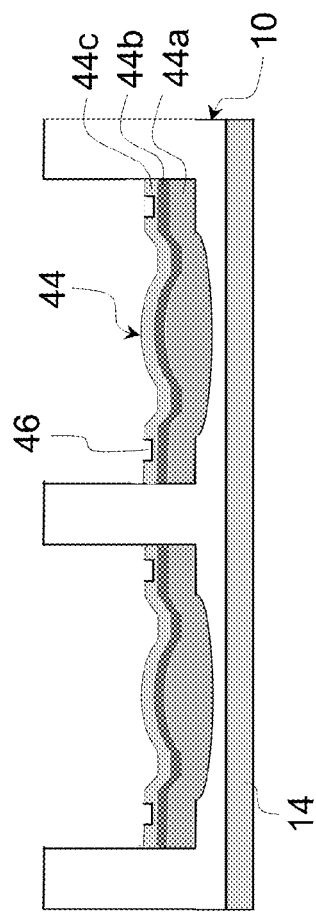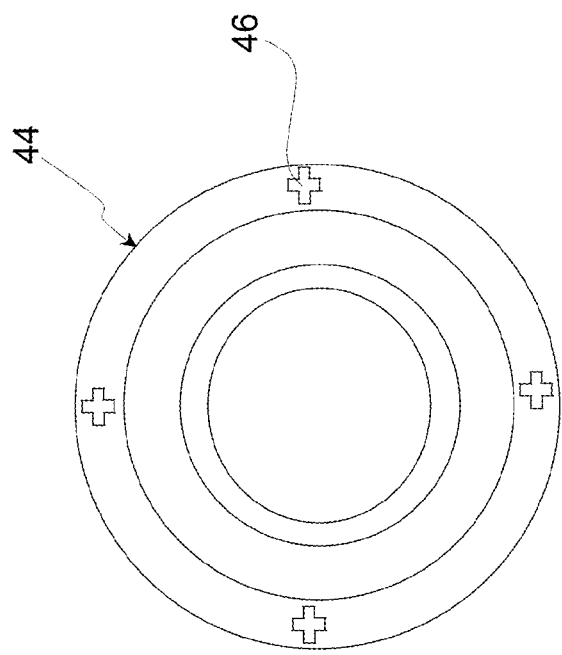
FIG. 11
FIG. 12

US 9,233,511 B2

METHOD OF MAKING STAMPED MULTI-LAYER POLYMER LENS

FIELD OF THE INVENTION

The present invention relates to lenses, and more particularly to lenses used in mobile devices such as cell phone cameras.

BACKGROUND OF THE INVENTION

CMOS image sensor chips are typically used in mobile devices such as cell phone cameras to capture images (e.g. cell phone camera or video functionality). These image sensors are usually very small and compact, given the limited size and weight requirements for mobile devices. The image sensor chip includes one or more lenses that are used to focus the incoming light onto a light sensor. The light sensor converts the incoming light into electronic signals that represent the image formed by the incoming light.

Lenses are often made of glass or polymer, and are typically made using a molding process. For example, polymer lenses are typically manufactured using molding techniques such as injection molding and transfer molding. Injection molding, for example, involves injecting polymer in a liquid state into a mold cavity. The polymer is then cooled so that it solidifies in the shape of the mold. The polymer is then removed from the mold in the form of a lens.

Molded lenses are easily mass-produced. For example, pluralities of molds are simultaneously injected with the lens material in a fluid state, followed by cooling, resulting in simultaneous formations of lenses. Traditional molding techniques produces lens that are monolithic, such that the optical properties from a single lens are limited. Therefore, for those applications requiring complex optical properties, multiple monolithic lenses of varying configuration can be stacked together. However, stacked monolithic lens configurations can be costly and excessively large in size.

There is a need for an improved lens and manufacturing technique for mass producing the lens that provides diverse optical property performance without adding significant cost or size.

BRIEF SUMMARY OF THE INVENTION

A method of forming lenses includes providing a lens handler having a plurality of cavities formed into an upper surface thereof, and for each of the cavities: dispensing a first polymer material into the cavity, pressing a non-planar stamp surface onto the first polymer material, wherein an upper surface of the first polymer material is conformed to the non-planar stamp surface, and applying UV light to the first polymer material to cure the first polymer material.

A method of forming lenses includes providing a lens handler having a plurality of cavities formed into an upper surface thereof, providing a dispenser carrier that includes a plurality of liquid polymer dispensers, dispensing a first polymer material into the cavities using the plurality of liquid polymer dispensers, providing a stamp carrier that includes a plurality of stamps each having a non-planar stamp surface, pressing the non-planar stamp surfaces onto the first polymer material in the cavities wherein upper surfaces of the first polymer material in the cavities are conformed to the non-planar stamp surfaces, providing a plurality of UV light sources, and curing the first polymer material in the cavities using UV light from the UV light sources.

A method of forming lenses includes forming a first layer of polymer material on a lens handler, providing a stamp handler having a plurality of stamps arranged along a curved surface wherein each of the stamps includes a non-planar stamp surface, rolling the stamp handler curved surface along the first polymer material such that an upper surface of the first polymer material conforms to the non-planar stamp surfaces, and curing the first polymer material using UV light from at least one UV light source.

Other objects and features of the present invention will become apparent by a review of the specification, claims and appended figures.

BRIEF DESCRIPTION OF THE DRAWINGS

FIGS. 1A and 1B are side cross sectional views of stacked lens design.

FIGS. 2A-2C are top views of lens handler designs having different cavity configurations.

FIG. 11 is a side cross sectional view of three-layer lenses formed on the lens handler.

FIG. 12 is a top view of the lenses formed on the lens handler.

DETAILED DESCRIPTION OF THE INVENTION

Figure 3:
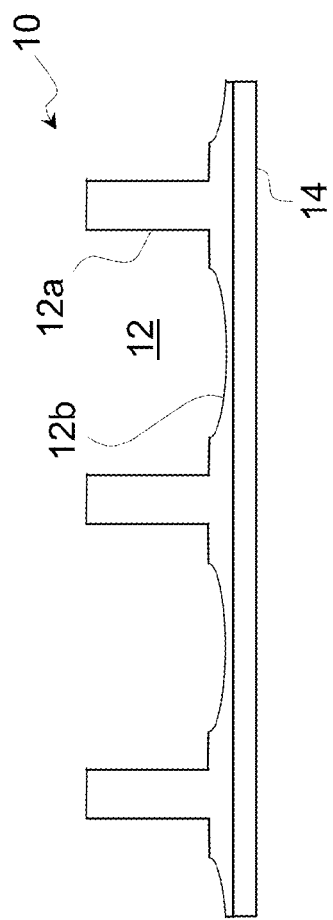
FIG. 3 is a side cross sectional view of the lens handler.

The present invention is relates to manufacture of multi-layer polymer lenses. The polymer material used in different layers can be the same or can vary, with each polymer layer having similar or different optical performance properties. Multi-layer polymer lenses can be n layers and n types of polymer materials. The numbers of layers and polymer types can vary by the design and performance requirements of the lens. The polymer can be epoxy silicone monomer, cycloaliphatic epoxy compounds, UV (ultraviolet) curable polymers, acrylate polymer, PMMA, COP, PC, ORNO-COMP or any other well-known optical polymer. Preferably, the polymer(s) comply with the following specifications:

| Property Range, Desired | VGA | MP Crown lens | MP Flint lens |
| --- | --- | --- | --- |
| Dispersion Vd | >47 ± 7 | >58 ± 5 | <33 ± 5 |
| RI | >1.53 ± 4 | >1.53 ± 4 | >1.55 ± 5 |
| CTE (ppm/C.) | 130 ± 30 | 130 ± 30 | 130 ± 30 |
| Tg (C.) (tentative) | <130 C. | <120 | <120 C. |
| Fracture Toughness | medium | high | moderate |
| UV cure shrinkage | <3% | <3% | <3% |
| Total Shrinkage (UV + Anneal) | <5% | <5% | <5% |
| Photospeed @10 mWcm2 | <4J | <4J | <4J |
| Yellowing | None | None | None |
| Stress Anneal @RT (MPa)* | <5 | <5 | <5 |

Examples of stacked VGA, Crown and Flint lens designs are illustrated in FIGS. 1A and 1B. FIG. 1A illustrates a VGA stacked lens with no achromatic correction, using four layers of polymers. FIG. 1B illustrates a lens with achromatic correction and both Crown and Flint designs, using eight layers of polymers. As described below, the steps in forming the each lens includes dispensing polymer into a cavity of a lens handler, stamping the dispensed polymer, curing the polymer, repeating the above steps until all n layers of polymer are formed, forming any requisite AR or IR coatings, embedding any alignment marks, and performing a quality test.

Lens formation begins by providing a lens handler 10, which is used for holding and shaping the lens forming polymers. Lens handler 10 can be made with any rigid material such as glass, fiberglass, Teflon, metal, etc., preferably with any necessary coatings that prevent the polymer from bonding to the handler 10. A non-limiting example is a lens handler 10 that is 6 to 12 inches wide, and made of glass. Glass is a preferred material for lens handler 10 because of its transparent property, which allows UV light to pass therethrough during the curing process, as further described below. A plurality of cavities 12 are formed into the top surface of the lens handler 10. FIGS. 2A, 2B and 2C illustrate three different lens handler designs. FIG. 2A illustrates a lens handler 10 with rectangular or square cavities 12 arranged in an array formation. FIG. 2B illustrates a lens handler 10 with circular cavities 12 arranged in an array formation. Circular cavities 12 are used to form circular lenses, which is a shape traditional dicing methods cannot achieve. The circle is the most material efficient shape for making lenses, and has higher tolerance to shocks and vibrations compared to square shaped lens. FIG. 2C illustrates a lens handler 10 with circular cavities 12 arranged in a honeycomb formation, which is a more efficient layout for circular shaped cavities.

FIG. 3 better illustrates the cavities 12 of handler 10. Each cavity 12 has a side wall 12a and a bottom surface 12b. The bottom surface 12b can be non-planar, which will end up forming additional lens structure on the back of the lens that will be formed in cavity 12. An optional removable heating element 14 can abut the bottom surface of the handler 10. Heating element 14, for example, can be a nichrome wire, hot liquid circulation, or other appropriate heating device. Optional reflective UV coatings can be formed on the cavity sidewall 12a and/or on the handler bottom surface facing the heating element 14 (to increase UV curing efficiency).

Figure 4:
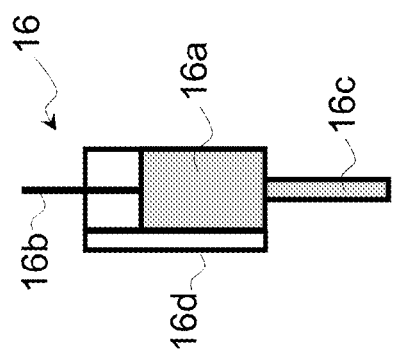
FIG. 4 is a side cross sectional view of the syringe dispenser.

FIG. 4 illustrates a conventional syringe dispenser 16, which is used to deposit the polymer into the lens handler cavities 12. Syringe dispenser 16 includes a cavity 16a and a plunger 16b that drives the liquid polymer in the cavity 16a out through a nozzle 16c. The syringe dispenser 16 can include a heating or cooling element 16d. Syringe dispensers are well known in the art and not further described herein.

Figure 5:
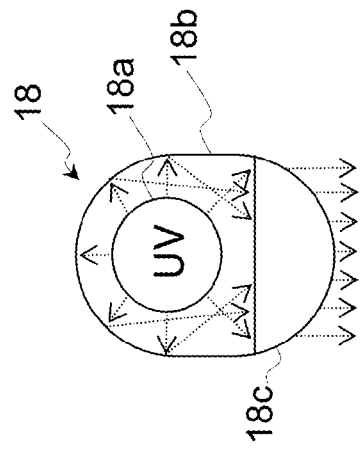
FIG. 5 is a side cross sectional view of the UV module.

FIG. 5 illustrates an ultraviolet (UV) module 18, which is used to cure the polymer after it has been deposited into cavities 12. Module 18 includes a UV source 18a, a reflective shield 18b and a lens 18c. UV source 18a can be any UV light emitting device, such as a UV light emitting diode (LED), a UV laser, a UV gas-discharge lamp, etc. UV LEDs are a preferred UV light emitting device. The UV source 18a is encapsulated inside the reflective shield 18b, which is partially elliptically shaped to reflect UV light toward the lens 18c, and preferably is coated with a UV reflective layer to prevent absorption and increases reflective efficiency. The lens 18c collimates the UV light. Together, the shield 18b and lens 18c can have an oval shape.

Figure 6B:
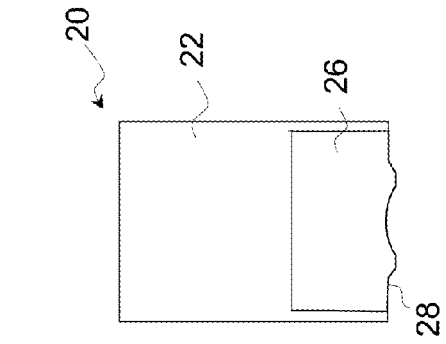
FIGS. 6a and 6B are side cross sectional views of the stamp handler assembly with stamp.
Figure 6A:
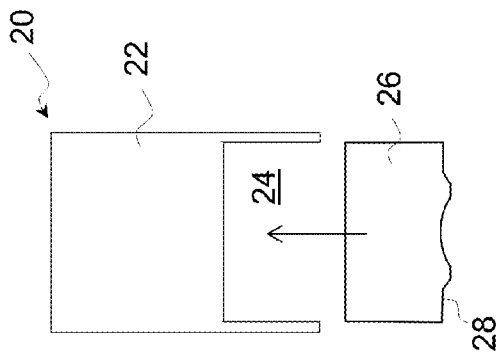

FIGS. 6A and 6B illustrate a stamp handler assembly 20, which is used to shape the top surface of the deposited polymer. The stamp handler assembly 20 includes a stamp handler 22 which defines a stamp cavity 24, and a stamp 26 that has a stamp surface 28. The stamp 26 can be made of a rigid material such as metal, glass, Teflon, polymer, etc., and is preferably square or circle shaped. Stamp 26 inserts into cavity 24 and is held therein preferably by friction fit, screws, bolts, adhesive, slide lock mechanism, magnetism, suction or other fastening means, with the stamp surface 28 left exposed. While stamp 26 can be used without stamp handler 22, it is preferable to utilize stamp handler 22 as a means for mounting and manipulating stamp 26 during use, and a means for removing and replacing stamps between uses.

Figure 7:
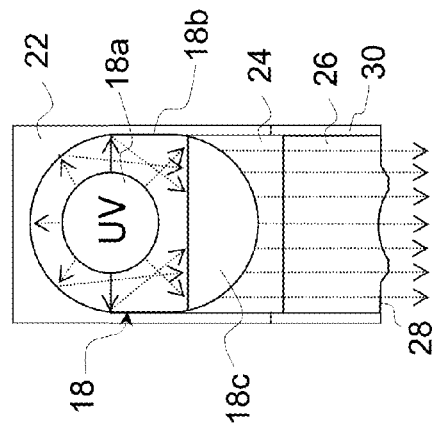
FIG. 7 is a side cross sectional view of the stamp handler assembly incorporating the UV module.

FIG. 7 illustrates an alternate embodiment of stamp handler assembly 20, where stamp handler 22 incorporates the UV module 18 therein. With this embodiment, stamp 26 is preferably made of a material that is at least partially transparent to UV light from the UV module 18. UV module 18 is pre-mounted inside the stamp cavity 24, and can be detachable if needed. Stamp 26 preferably inserts into stamp cavity 24 in such a manner that there is gap between stamp 26 and lens 18c. An optional heating element 30 can be included as part of the stamp handler to heat stamp 26 (and stamp surface 28 in particular). When heating element 30 is included, stamp 26 is preferably made of a high thermal conductivity material such as a metal alloy. Heating element 30 can be nichrome wire, copper pipe (with liquid circulation), an inductive heating system or any other appropriate heat source. Heating element 30 could be included in the embodiment of FIGS. 6A and 6B as well, in which case there would preferably be gap between the top surface of stamp 26 and the top surface of cavity 24 when the stamp 26 is fully inserted in handler 22.

Figure 8:
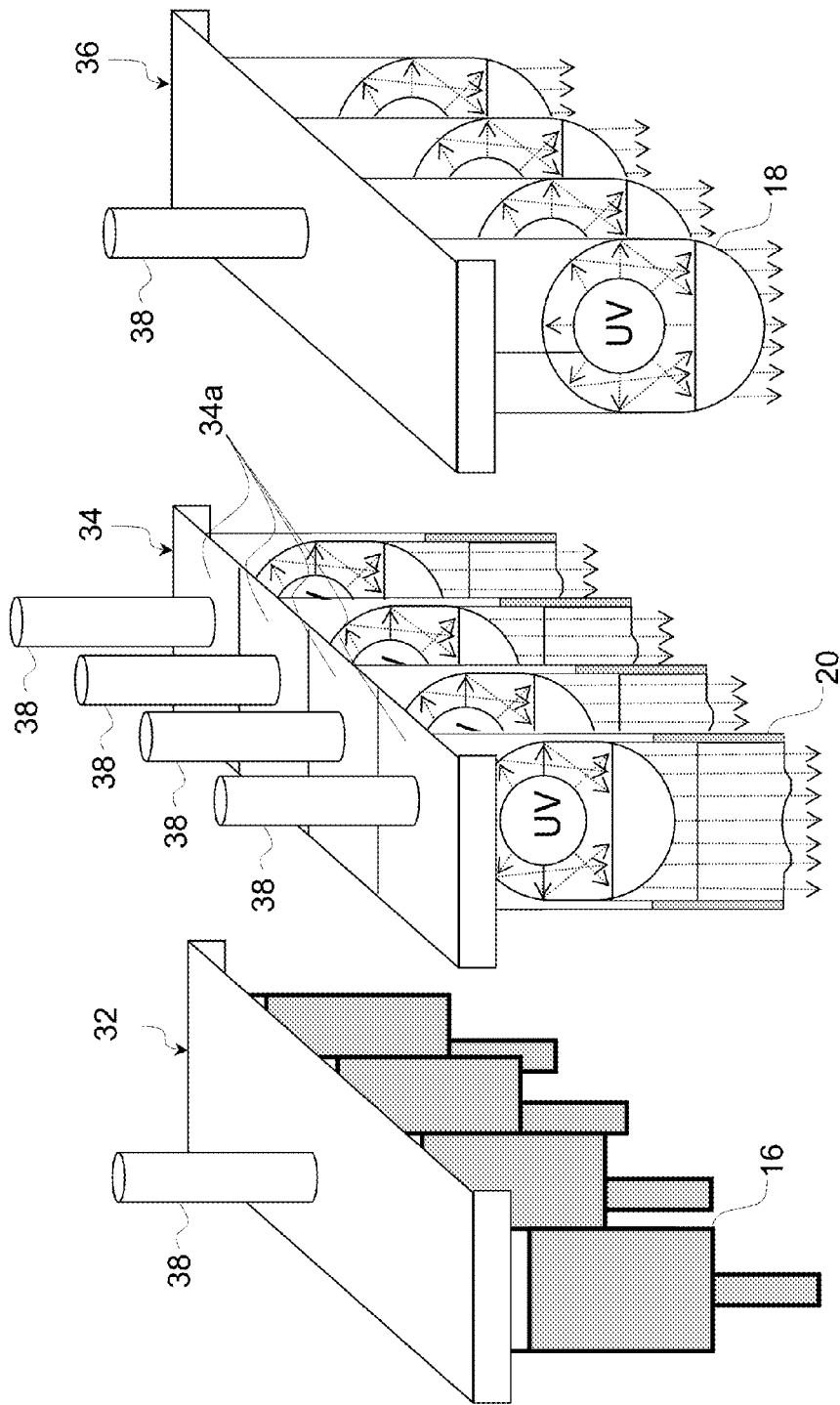
FIG. 8 is a perspective view illustrating the dispenser carrier, the stamp carrier and the UV module carrier.

FIG. 8 illustrates three carriers used to manipulate the dispensers 16, stamps 26 and UV modules 18 during the formation of lenses in the cavities 12 of lens handler 10. The dispenser carrier 32 includes a plurality of the syringe dispensers 16 mounted to a rigid plate or similar member. The stamp carrier 34 includes a plurality of the stamp handler assemblies 20 mounted to a rigid plate or similar member. The UV module carrier 36 includes a plurality of the UV modules 18 mounted to a rigid plate or similar member. The carriers 32, 34, 36 are able to move up and down, left and right, and forward and backward using drive mechanisms 38 (e.g. electric actuators, hydraulics, a combination of the two, etc.). Different types of drive mechanisms can be used among carriers 32, 34, 36. Preferably, but not necessarily, the stamp carrier 34 is configured as a plurality of subcarriers 34a, each supporting a single stamp handler assembly 20 and operated independently (e.g. each having it own drive mechanism), so that each stamp handler assembly 20 can be independently moved and operated for increased accuracy.

Figure 9C:
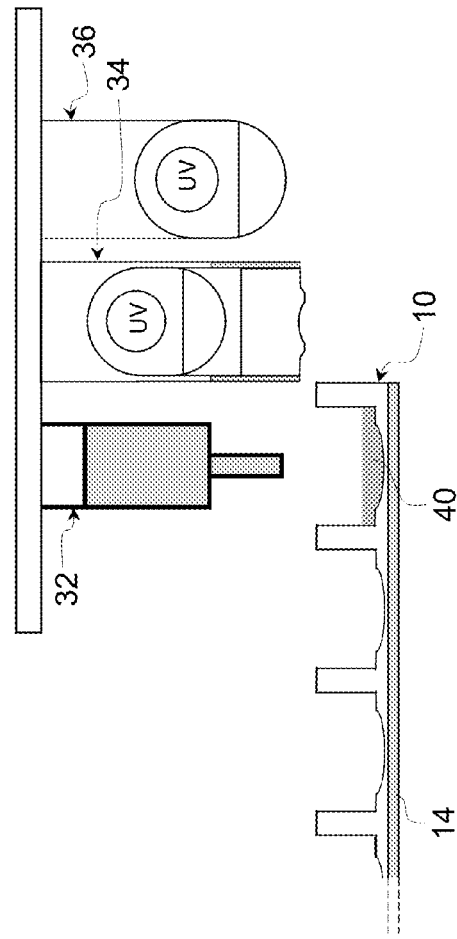
FIGS. 9A-9P are side cross sectional views illustrating in order the steps of forming lenses by dispensing, stamping and curing polymer on the lens handler.
Figure 9D:
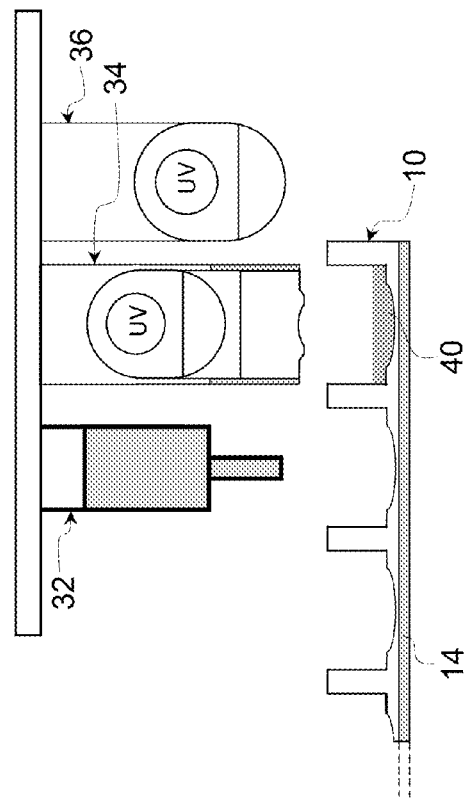
Figure 9E:
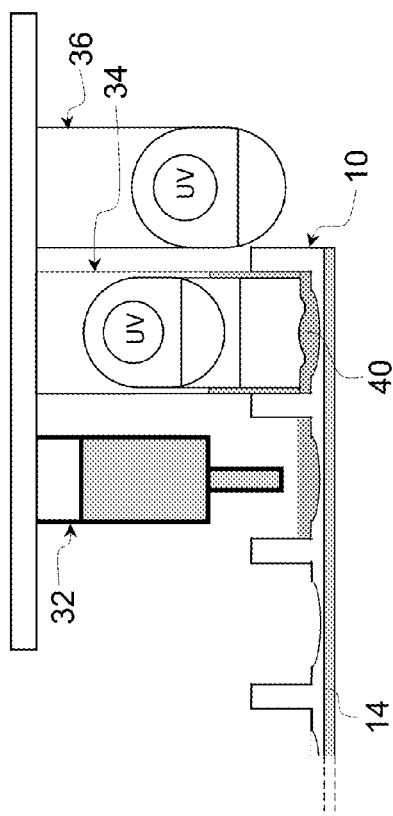

FIGS. 9A-9P illustrate the formation of lenses using lens handler 10 and carriers 32/34/36. The lenses can be formed with multiple layers, but each layer is formed using the same process: dispense the polymer, stamp the polymer, and cure the polymer. FIG. 9A illustrates the beginning of the process, where the dispenser carrier 32 is positioned over the first row of cavities 12. The dispenser carrier 32 is lowered into the first row of cavities 12, and the syringe dispensers 16 dispense polymer 40 into the first row of cavities 12, as illustrated in FIG. 9B. The dispenser carrier 32 is raised out of the first row of cavities 12 (see FIG. 9C) and moved laterally so that dispenser carrier 32 is positioned over the second row of cavities 12 while the stamp carrier 34 is positioned over the first row of cavities 12 (see FIG. 9D). The dispenser carrier 32 is lowered in the second row of cavities 12 (in which it dispenses polymer 40) and stamp carrier 34 is lowered in the first row of cavities 12 such that the stamp surfaces 28 are pressed against the polymer upper surfaces (whereby the polymer 40 therein is stamped and cured so that the top surfaces thereof conform with stamp surfaces 28 of the stamps 26), as illustrated in FIG. 9E.

Figure 9F:
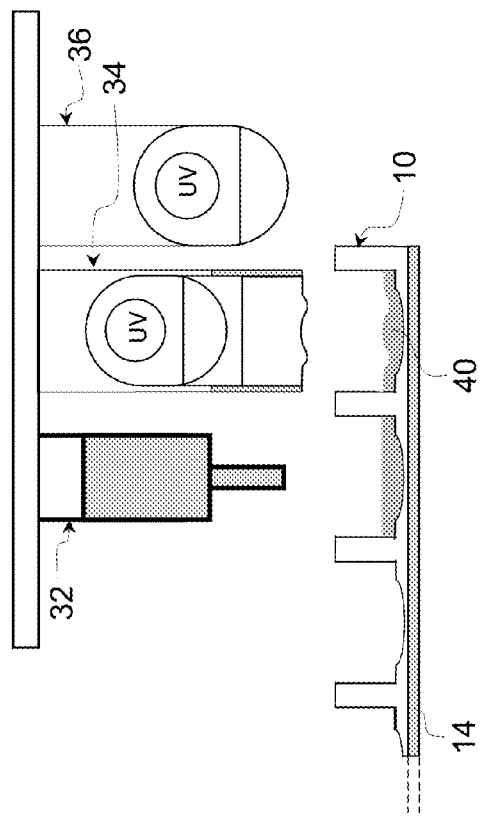
Figure 9G:
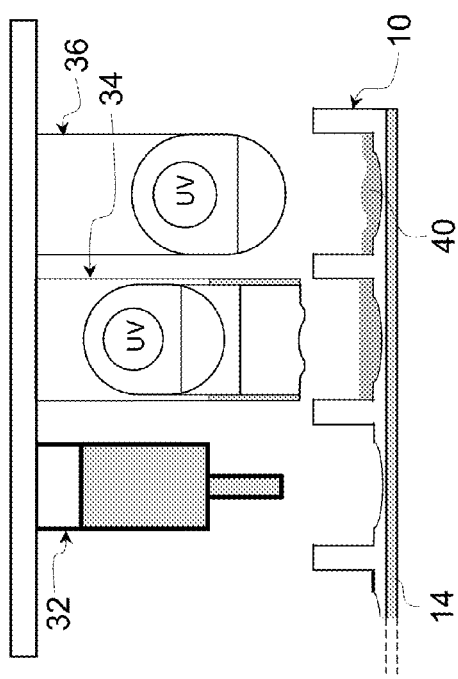
Figure 9H:
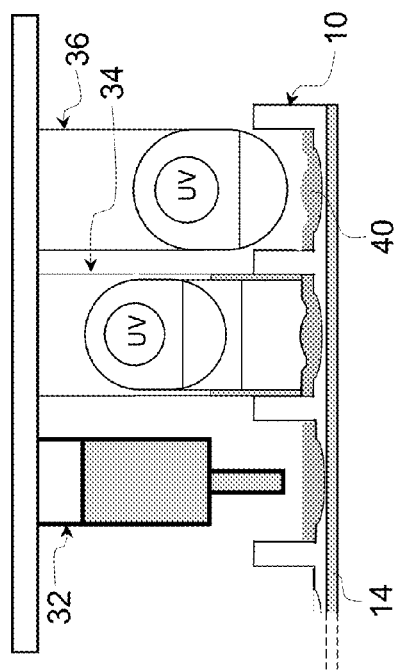

The dispenser and stamp carriers 32, 34 are raised out of the first two rows of cavities 12 (see FIG. 9F) and moved laterally so that dispenser carrier 32 is positioned over the third row of cavities 12 while the stamp carrier 34 is positioned over the second row of cavities 12 and UV module carrier 36 is positioned over the first row of cavities 12 (see FIG. 9G). The dispenser carrier 32 is lowered in the third row of cavities 12 (in which it dispenses polymer 40), stamp carrier 34 is lowered in the second row of cavities 12 such that the stamp surfaces 28 are pressed against the polymer upper surfaces (whereby the polymer 40 is stamped and cured so that the top surfaces thereof conform with stamp surfaces 28 of the stamps 26), and UV module carrier is lowered in the first row of cavities 12 (whereby the polymer therein is further cured by UV light), as illustrated in FIG. 9H.

Figure 9I:
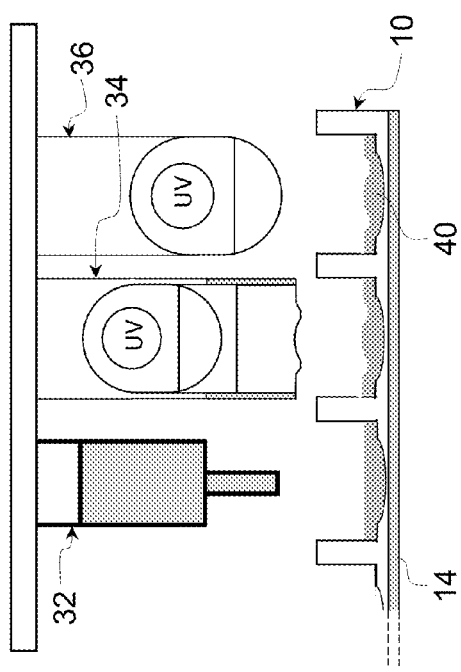
Figure 9J:
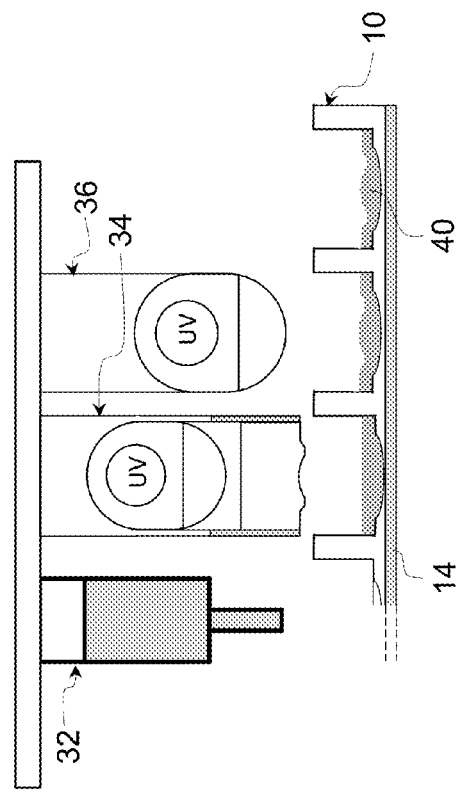
Figure 9K:
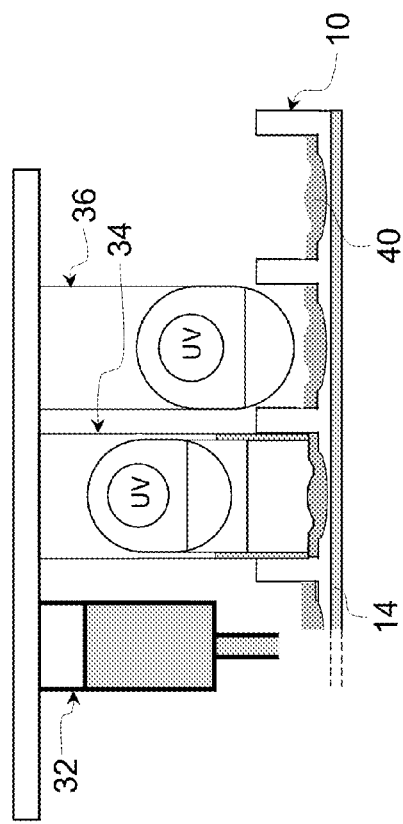
Figure 9L:
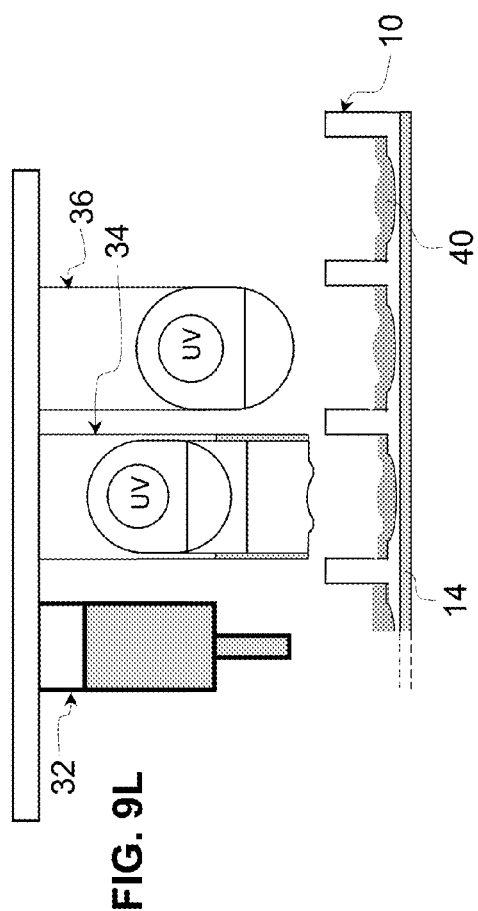

The dispenser, stamp and UV module carriers 32, 34, 36 are raised out of the first three rows of cavities 12 (see FIG. 9I) and moved laterally so that dispenser carrier 32 is positioned over the fourth row of cavities 12 while the stamp carrier 34 is positioned over the third row of cavities 12 and UV module carrier 36 is positioned over the second row of cavities 12 (see FIG. 9J). The process then continues until the polymer 40 for each cavity has been dispensed, stamped and cured (see FIGS. 9K to 9P).

Figure 10:
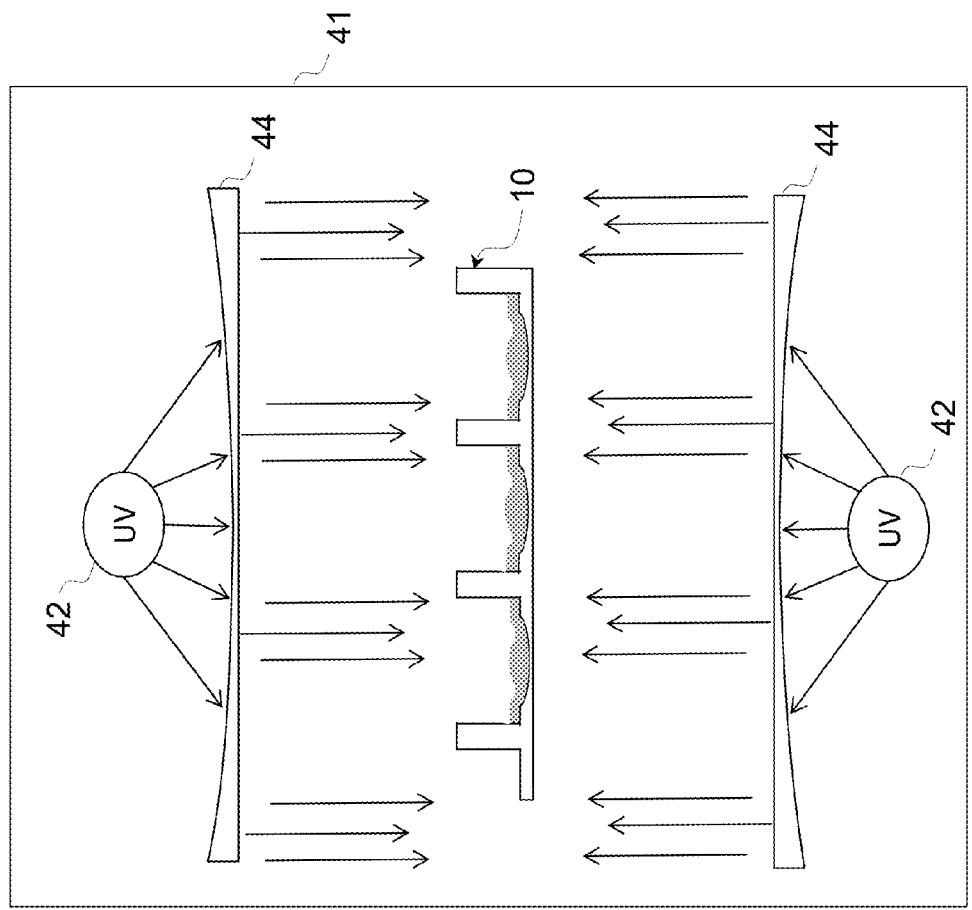
FIG. 10 is a side cross sectional view of a UV oven.

Further optional curing can be accomplished by placing the lens handler 10 in a UV oven 41, which includes one or more UV light sources 42 and lenses 44, as illustrated in FIG. 10. If the lens handler 10 included a heating element 14, it can be removed for better curing results. The UV oven 41 includes two UV sources 42 mounted above and below the space containing the lens handler 10. Lenses 44 collimate the UV light so that it is uniform and parallel as it strikes the lens handler 10.

The above dispensing, stamping and curing process can be repeated to form additional polymer layers, one over another, in each cavity 12, stamped with the same or different shaped stamp 26, using the same or different polymer composition, resulting in a multi-layer polymer lens 44 as illustrated in FIG. 11. The lenses illustrated in FIG. 11 have three polymer layers 44a, 44b and 44c, but more or fewer layers can be formed. The layers 44a, 44b, 44c can be formed using the same polymer material or differing polymer materials, and each layer can be stamped with the same or varying shaped stamp. The optional curing illustrated in FIG. 10 can occur after each layer of polymer is formed, and/or after all the layers of polymer are formed. Optional antireflective (AR) and/or infrared (IR) coatings can be applied to either the front and/or back surfaces of the finished lens 44. One technique for forming these coatings on the back surfaces of lenses 44 is to remove lenses 44 from lens handler 10, flip over the lenses 44, and place them back into handler 10 for coating. AR/IR coating process(es) can be any of the standard deposition technique for AR/IR coating (which are well known in the art). Optional alignment marks 46 can be formed in lenses 44. Preferably, alignment marks 46 are protrusions or cavities formed in the top surface of lenses 44 (e.g. formed with a deposition step using a polymer, epoxy, resin, metal as protrusions, or formed using a laser as cavities). Preferably, alignment marks 46 are equal to or greater than 3 μm in height or in depth. In the embodiment illustrated in FIGS. 11 and 12, alignment marks 46 are crossing trenches formed into lenses 44.

Preferably, the finished lens is then tested for optical quality, with the known good lenses then removed and placed in the trays for lens module assembly.

Figure 13:
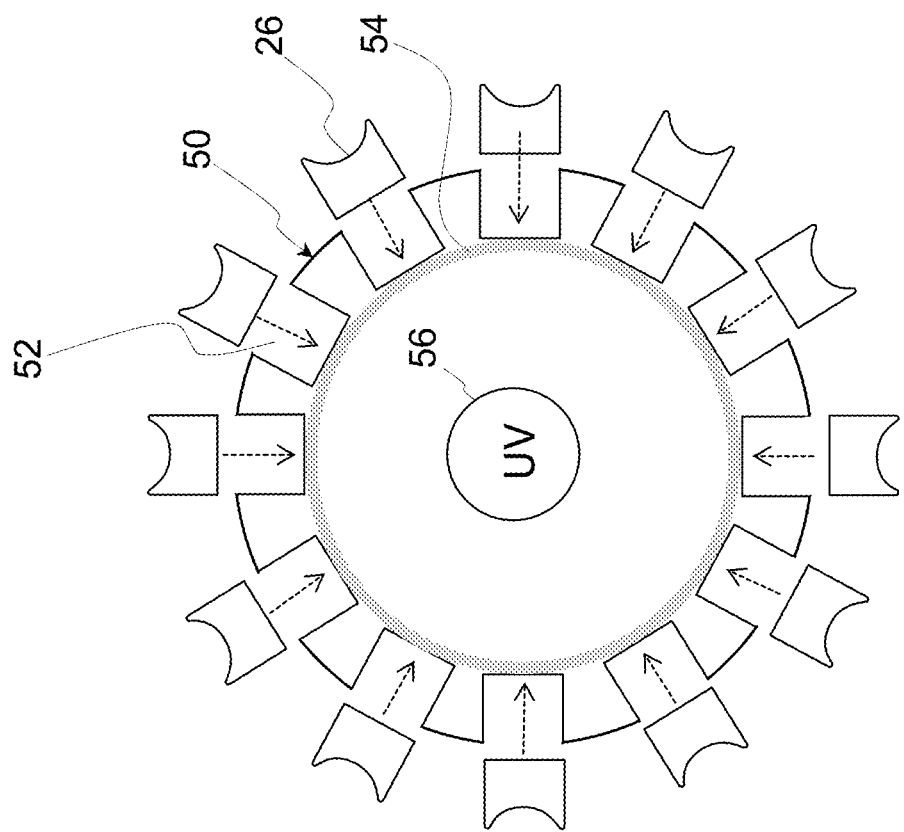
FIG. 13 is side cross sectional view of an alternate embodiment of the stamp handler assembly.

FIGS. 13-16 illustrate an alternate embodiment of the stamp handler assembly, where a stamp handler assembly 50 is configured in the form of a stamp roller with outwardly facing cavities 52 for the stamps 26. Specifically, stamp handler assembly 50 has a circular cross section, with an outwardly facing surface into which stamp cavities 52 are formed, as illustrated in FIG. 13. Stamps 26 are mounted into cavities 52 as similarly explained above. An optional heating device 54 is used to heat the stamps 26. An optional UV light source 56 is disposed inside the stamp handler assembly 50. While FIG. 13 illustrates a single column of stamp cavities 52 and stamps 26, there can be a plurality of columns of stamp cavities 52 and stamps 26 at the outer surface of stamp handler assembly 50.

Figure 14:
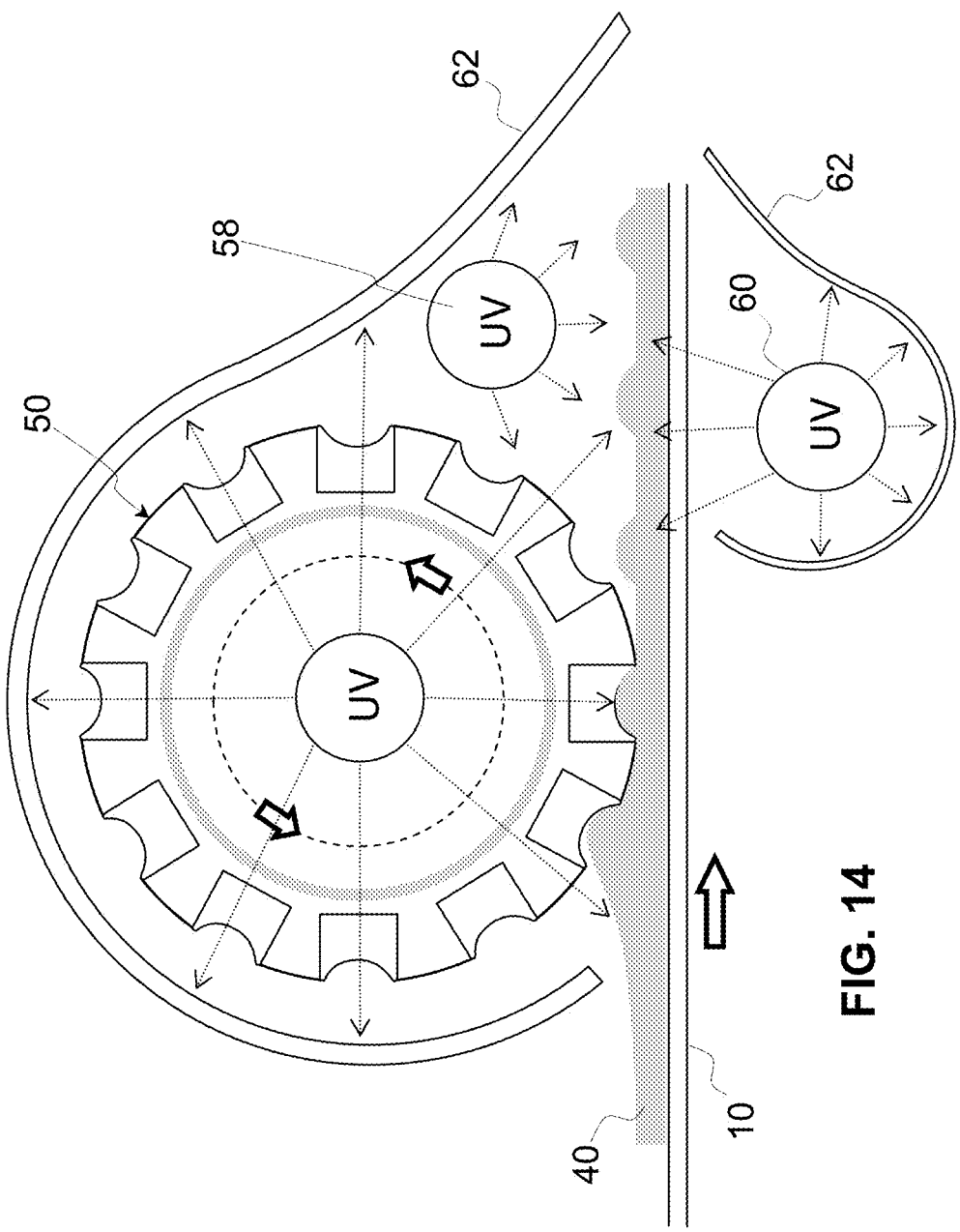
FIG. 14 is side cross sectional view of the alternate embodiment of the stamp handler assembly, partially rolled across a first polymer layer on the lens handler.

FIG. 14 illustrates the stamp handler assembly 50 in operation. The lens handler 10 in this embodiment includes a flat upper surface on which the layer of polymer 40 is deposited, preferably by spray or spin coating. Lens handler 10 in this embodiment is preferably made of glass. The stamp handler assembly 50 stamps the polymer 40 by rolling over the polymer 40 on lens handler 10, leaving the upper surface of polymer 40 shaped as dictated by stamps 26. Rolling can be implemented by moving lens handler 10 relative to stamp handler assembly 50, or vice versa, or both, while stamp handler assembly 50 rotates about its axis. The UV source 56 inside the stamp handler assembly cures the polymer 40 as it is shaped by stamps 26. Additional UV sources 58 and 60 above and below lens handler 10, respectively, can provide additional UV light for curing polymer 40 after being stamped by stamps 26. Reflectors 62 can redirect escaping UV light toward the polymer 40 to increase curing efficiency.

Figure 15:
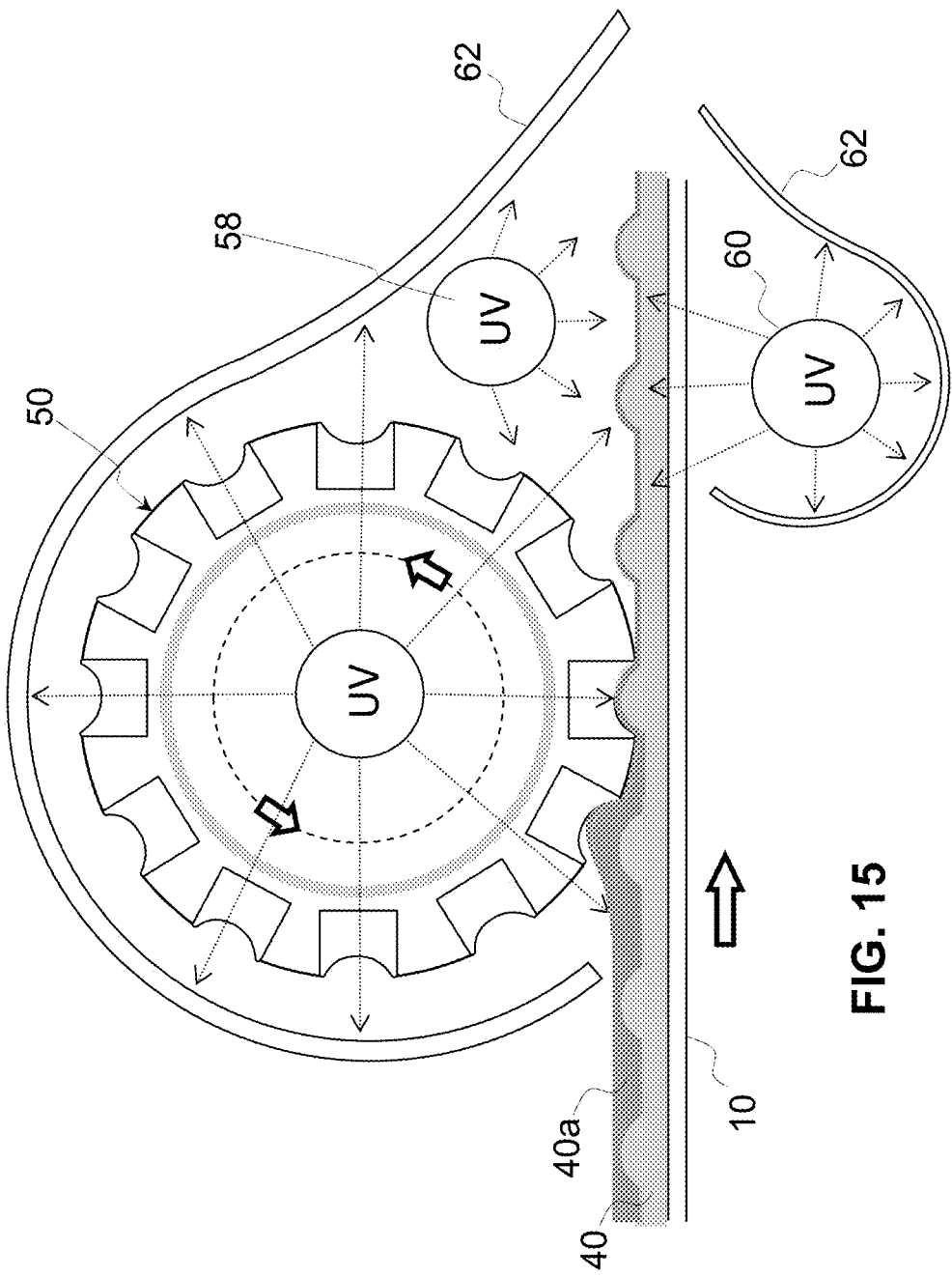
FIG. 15 is side cross sectional view of the alternate embodiment of the stamp handler assembly, partially rolled across a second polymer layer on the lens handler.
Figure 16:
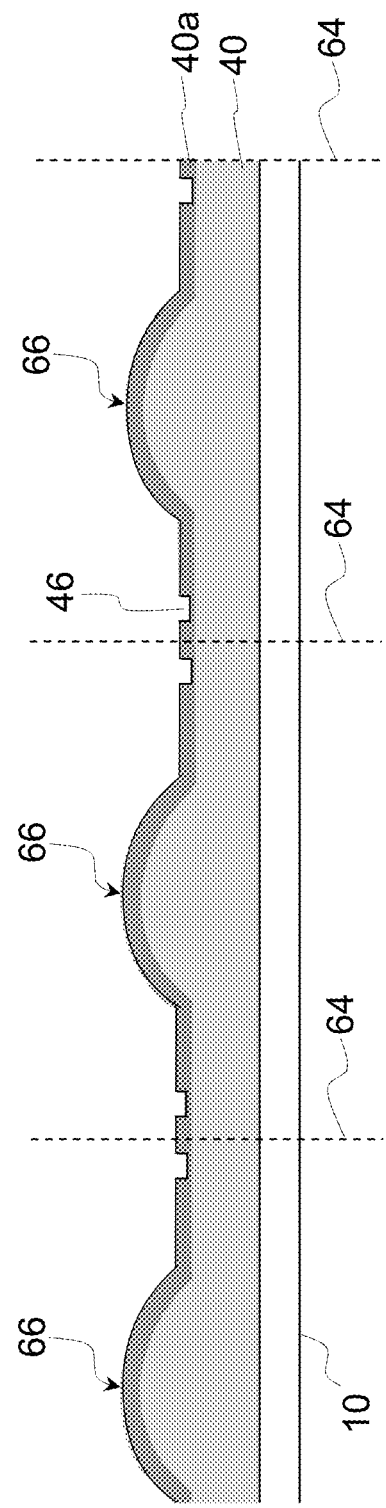
FIG. 16 is a side cross sectional view of two-layer lenses formed on the lens handler.

FIG. 15 illustrates the stamping process being repeated for a second layer of polymer 40a, which can be the same material as polymer 40 or can be different. Any number of additional layers of polymer can be added and stamped with the same or different shaped stamps 26. Additional curing can be performed using a UV oven as described above, either after each polymer layer is formed, and/or after all the polymer layers are formed.

Optional AR/IR coating(s) can be applied on the front and/or back of the lens as described above. Alignment marks can also be applied as described above and illustrated in FIG. 16. A dicing process is performed to singulate the lenses along dicing lines 64, resulting in individual lenses 66. Dicing can be done mechanically or using a laser, as is well known in the art. Each singulated lens 66 can then be tested, removed from handler 10, and placed in a separate tray for further assembly.

Figure 17:
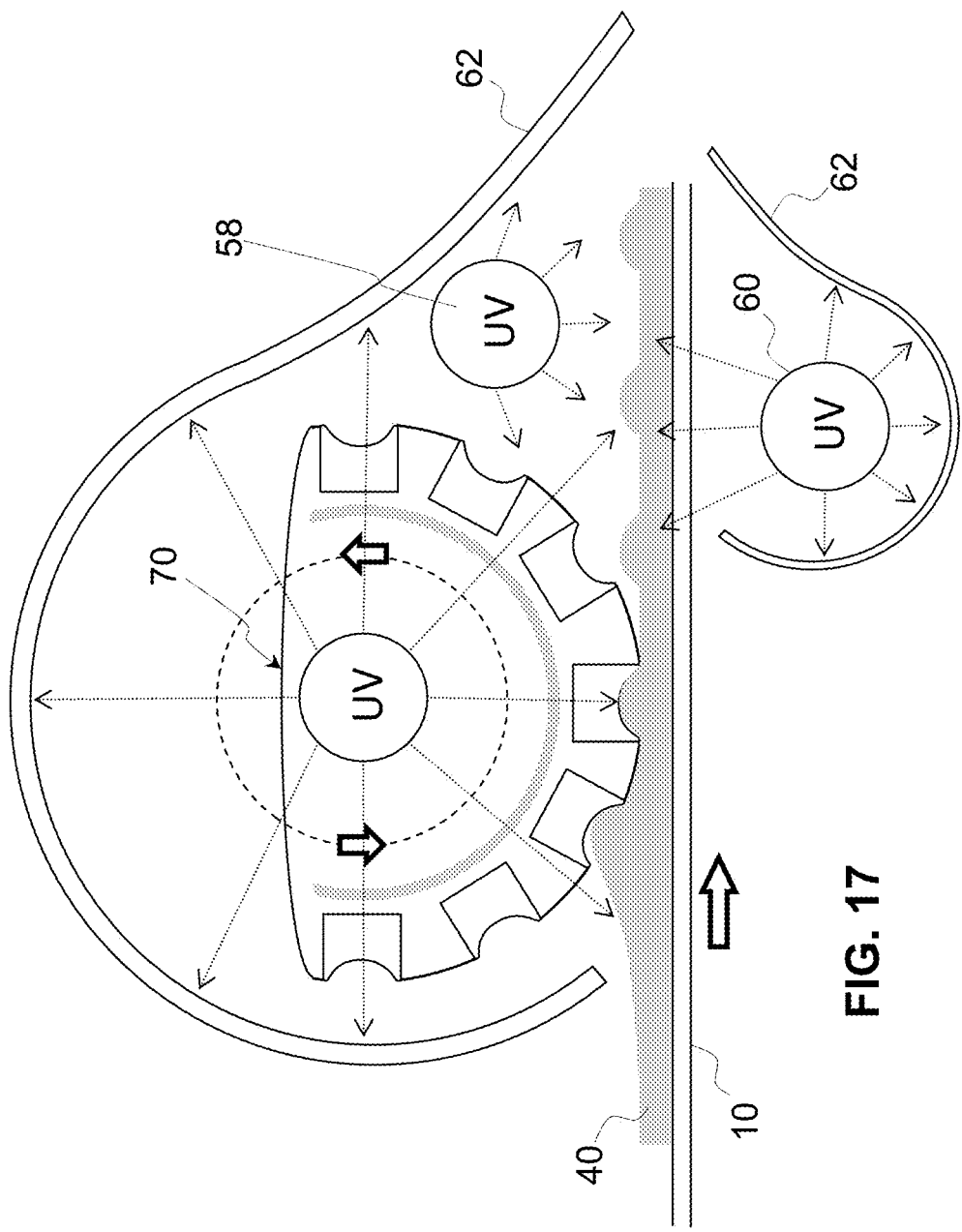
FIG. 17 is side cross sectional view of a second alternate embodiment of the stamp handler assembly, partially rolled across a first polymer layer on the lens handler.

The stamp handler assembly 50 need not include stamps 26 around its entire circumference. For example, FIG. 17 illustrates stamp handler assembly 70 which is the same as assembly 50 except stamps 26 are configured only part way around assembly 70. The operation of stamp handler assembly 70 is the same as described above for assembly 50, except after the stamp handler assembly 70 rolls onto its last stamp 26, the assembly 70 lifts up and rotates clockwise back to its first stamp 26, and is lowered back down to resume the stamping process.

It is to be understood that the present invention is not limited to the embodiment(s) described above and illustrated herein, but encompasses any and all variations falling within the scope of the appended claims. For example, references to the present invention herein are not intended to limit the scope of any claim or claim term, but instead merely make reference to one or more features that may be covered by one or more of the claims. Materials, processes and numerical examples described above are exemplary only, and should not be deemed to limit the claims. Further, as is apparent from the claims and specification, not all method steps need be performed in the exact order illustrated or claimed, but rather in any order that allows the proper formation of the polymer lenses described herein. Lastly, single layers of material could be formed as multiple layers of such or similar materials, and vice versa.

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements therebetween, as well as forming the element indirectly on the substrate with one or more intermediate materials/elements therebetween.

What is claimed is:

1. A method of forming lenses, comprising:
   providing a lens handler having a plurality of cavities formed into an upper surface thereof;
   providing a dispenser carrier that includes a plurality of liquid polymer dispensers;
   dispensing a first polymer material into the cavities using the plurality of liquid polymer dispensers;
   providing a stamp carrier that includes a plurality of stamps each having a non-planar stamp surface;
   pressing the non-planar stamp surfaces onto the first polymer material in the cavities, wherein upper surfaces of the first polymer material in the cavities are conformed to the non-planar stamp surfaces;
   providing a plurality of UV light sources; and
   curing the first polymer material in the cavities using UV light from the UV light sources;
   wherein:
      the stamp carrier comprises a plurality of stamp handlers,
      each of the stamp handlers includes one of the plurality of UV light sources mounted thereto and one of the plurality of stamps mounted thereto, and
      each of the plurality of stamps is at least partially transparent to the UV light from a respective one of the UV light sources.

2. The method of claim 1, wherein each of the stamp handlers further comprises a heating element for heating the stamp mounted thereto.

3. The method of claim 1, further comprising:
   providing a UV module carrier that includes a second plurality of UV light sources;
   after the pressing, curing the first polymer material in the cavities using UV light from the second plurality of UV light sources.

\* \* \* \* \*